(12) United States Patent
Patapoutian et al.

(10) Patent No.: US 6,957,379 B1
(45) Date of Patent: Oct. 18, 2005

(54) METHOD AND APPARATUS FOR SELECTING STORAGE CAPACITY OF DATA STORAGE MEDIA

(75) Inventors: Ara Patapoutian, Westborough, MA (US); Michael Mallary, Berlin, MA (US); Michael Leis, Farmington, MA (US); Steven Lambert, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 509 days.

(21) Appl. No.: 09/924,064

(22) Filed: Aug. 7, 2001

Related U.S. Application Data (63) Continuation-in-part of application No. 09/225,251, filed on Jan. 4, 1999, now abandoned.

(51) Int. Cl.[7] ............................................. H03M 13/00
(52) U.S. Cl. ....................................... 714/774; 360/31
(58) Field of Search ......................... 714/774; 369/58; 360/31, 48, 75, 61

(56) References Cited

U.S. PATENT DOCUMENTS

| | | | |
|---|---|---|---|
| 4,799,112 A | 1/1989 | Bremmer et al. | 360/31 |
| 5,216,655 A | 6/1993 | Hearn et al. | 369/58 |
| 5,521,945 A | 5/1996 | Knudson | 375/341 |
| 5,537,264 A | 7/1996 | Pinteric | 360/31 |
| 5,587,850 A | 12/1996 | Ton-that | 360/77.08 |
| 5,596,458 A | 1/1997 | Emo et al. | 360/48 |
| 6,091,559 A | 7/2000 | Emo et al. | 360/48 |

OTHER PUBLICATIONS

U.S. Appl. No. 10/053,220, filed Jan. 17, 2002, Chiao et al.
Jensen, Roy A. et al.; "Demonstration of 500 Megabits per Square Inch with Digital Magnetic Recording;" IEEE Transactions on Magnetics; vol. 26; No. 5; Sep. 1990; pp. 2169-2171.

*Primary Examiner*—Phung My Chung (57) ABSTRACT

An apparatus and method for increasing the data storage capacity of a data storage device 100 having media surfaces 23. One or more of a linear density of data, a track density of data, or an error code level of data, is selected for a portion 35 of a media surface 23. Data is recorded on the portion 35 of the media surface 23 at the selected linear density, track density, or error code level. Thereafter, the recorded data is read and an error rate of the recorded data is derived, directly or indirectly. The derived error rate is compared to an acceptable error rate, and if the derived error rate is greater than the acceptable error rate, the previous steps are repeated for another linear density, track density, or error code level, until the derived error rate is less than or equal to the acceptable error rate, to provide a recordable linear density, track density, or error code level of data for the media surface 23.

58 Claims, 6 Drawing Sheets

METHOD AND APPARATUS FOR SELECTING STORAGE CAPACITY OF DATA STORAGE MEDIA

REFERENCE TO RELATED APPLICATION

This is a continuation-in-part of U.S. patent application Ser. No. 09/225,251 filed on Jan. 4, 1999 now abandoned. The contents of application Ser. No. 09/225,251 are incorporated herein by reference.

BACKGROUND

The present invention relates to improving the data storage capacity of a data storage device.

Data storage devices, such as hard disks, floppy disks, optical drives or tape drives, are used to store data and operating instructions for computers. A typical disk drive comprises a number of disks each having a media surface coated with storage media to store computer data. For example, a media surface can comprise magnetic media which stores data in the form of two distinct magnetization states (corresponding to 0 and 1 in digital data) in a plurality of tracks. A magnetic head is coupled or paired with the media surface. Each paired magnetic head and media surface couples to provide a unique data recording capability which depends upon the fly height of the magnetic head from the media surface, the quality/distribution of magnetic media on the media surface, and the magnetic properties of the magnetic head.

Conventional methods of recording data using the paired magnetic head and media surface are inefficient because they do not take into account the differences in data recording capabilities between one pair of magnetic head and media surface and another head/surface pair. Typically, a single error code level and a single storage capacity level are used to record data for all the paired magnetic heads and media surfaces. This results in inefficient data storage for those pairs of magnetic heads and media surfaces that can store more data. It also lowers the qualification yields of the disk drives simply because one or more pairs of magnetic heads and media surfaces do not record data at the qualifying error rate and capacity levels.

The need for disk drives having higher data storage capacities increases as computer programs become larger and more complex. The disk capacity of a disk drive is the sum of the surface capacities of the media surfaces. The surface capacity is the total number of data bits that can be stored on a media surface. Data storage capacity can be increased by using a larger number of disks or by increasing their surface area. However, a larger surface area results in longer time delays in positioning a magnetic head over a particular track or portion on the disk. Moreover, increasing either the size or the number of disks will increase the external dimensions or "form factor" of the disk drive, which is against prevailing trends to shrink drive size. Also, larger disks or more numerous disks increase the energy consumption of the disk drive, which is also undesirable. Thus, it is desirable to increase the data storage capacity of a device without increasing disk size or number.

One method of increasing the data storage capacity of a disk drive comprises increasing the areal density of the data stored on the media surfaces (bits/sq. in.—BPSI). Areal density is the track density which is the number of tracks per radial inch (TPI) that can be packed onto the media surface, multiplied by the linear density (BPI) which is the number of bits of data that can be stored per linear inch. In addition, lower levels of error correcting codes (ECC) which are used to detect and correct errors in the retrieved data by adding extra parity bits or a number of redundant bits for each logical block of data (byte) that is stored on the media surface also increase data storage because of the added redundancy bits or parity bits. Typically, the track density, linear density, and level of error code are set to predetermined levels to ensure that 90% or more of the paired magnetic heads and media surfaces record data with less than the specified error rate.

Another problem arises because conventional processes for qualifying disk drives scrap a disk drive when the measured disk capacity of the disk drive is less than a target disk capacity. Conventionally, each media storage surface is formatted to store the same amount of data as every other media surface. Thus, a media surface that has a low error rate is formatted to the same TPI, BPI, and ECC levels, as a media surface having a high error rate, even though it can store more data. However, by adopting a single TPI, BPI, and ECC level for every media surface, current processes fail to account for the differences in sensitivity and accuracy of the paired magnetic head and media surfaces, which results in less data storage and more wastage of space on each media surface. Also, this results in lower overall yields of disk drives because if even a few of the media surfaces do not meet their targeted capacity, the sum of the surface capacities of all the media surfaces will be less than the target disk capacity, causing the entire disk drive to fail qualification.

The yield of disk drives is further lowered when the disk drive does not meet the desired qualifying error rate levels. Manufacturers often specify an upper limit on the maximum error rate that can be allowed in recovering stored data from a disk drive for it to be acceptable. Typically, the disk drive is assembled and formatted, data is stored on the drive, and then the stored data is read to calculate the error rate of the drive. Disk drives in which each paired head/surface has an error rate lower than the maximum error rate pass qualification while the other drives fail. Thus, it is desirable to have a method of testing disk drives that does not require the entire disk drive to be discarded if a single paired head and surface fail to meet the desired error performance level.

Accordingly, it is desirable to have an apparatus and method of storing data on data storage media that maximizes its data storage capacity. It is further desirable to compensate for the storage inefficiencies of particular pairs of magnetic heads and media surfaces. It is also desirable to have a disk drive with increased capacity and reduced error rates. It is further desirable to increase the yields of disk drives obtained during their qualification.

SUMMARY

The present invention is capable of increasing a data storage capacity of a data storage device having a media surface by compensating for the storage inefficiencies of a particular pair of magnetic head and media surface. In one aspect, the present invention comprises a method in which one or more of a linear density of data, a track density of data (i.e. the number of tracks per inch (TPI)), or an error code level of data, is selected. Data is recorded on a portion of the media surface at the selected linear density, track density, or error code level. Thereafter, the recorded data is read and an error rate of the recorded data is measured. The measured error rate is compared to an acceptable error rate, and if the measured error rate is greater than the acceptable error rate, the previous steps are repeated for another linear density, TPI, or error code level, which is an increment or decrement of the original value, until the measured error rate is less than or equal to the acceptable error rate. This method predetermines a recordable linear density, TPI, or error code level of data for that portion of the media surface. This method increases the data storage efficiency of the data storage device by optimizing linear density, TPI, and error code level for each portion of a media surface for a particular paired head and surface.

In another aspect, the present invention comprises a method of testing a data storage device having a plurality of media surfaces. The method comprising measuring for each media surface, at least one of a maximum recordable linear density of data, maximum TPI, or a minimum recordable error code level of data. The surface capacity of each media surface is calculated from the measured maximum recordable TPI, maximum recordable linear density, or minimum error code level. The calculated surface capacities of each media surface are summed to determine a device capacity. The data storage device is passed through qualification if the device capacity equals or exceeds a target capacity, and is failed if it does not. This method increases the yield of the data storage devices by storing less data on poor quality pairs of magnetic heads and media surfaces and storing more data on high quality pairs of magnetic heads and media surfaces.

In yet another aspect, the present invention comprises a data storage device comprising a head and a media surface. A device controller is capable of providing signals to the head for reading and writing data on a portion of the media surface, at a predetermined recordable TPI, linear data density, or error code level of data, one or more of which is measured. Preferably, the controller is programmed to write data on each portion of the media surface at a plurality of TPI, linear density, or error code levels of data; and more preferably programmed to write data on each portion of the media surface at a maximum recordable TPI, maximum recordable linear density of data, or a minimum recordable error code level of data, each of which is measured for a paired head and media surface.

In another aspect, the present invention comprises a data storage device comprising a plurality of pairs of media surfaces and heads. A controller that controls the heads for reading and writing data on the media surfaces, the controller being programmed to write data at a measured track density (TPI), linear data density, or error code level of data, one or more of which are measured by the steps of:

(a) selecting for a portion of a media surface, a linear density, TPI density, or error code level of data;

(b) recording data on the portion of the media surface at the selected linear density, TPI density, or error code level;

(c) reading the recorded data and measuring an error rate of the recorded data; and (d) comparing the measured error rate to an acceptable error rate, and if the measured error rate is greater than the acceptable error rate, repeating steps (b) to (d) for another linear density, TPI density, or error code level, until the measured error rate is less than or equal to the acceptable error rate, to determine a measured linear density, TPI density, or error code level of data for the portion of the media surface.

DRAWINGS

These and other features, aspects, and advantages of the present invention will be better understood from the following drawings, description, and appended claims, all of which provide illustrative examples of the invention, where:

DESCRIPTION

Data storage devices used to store data for computer systems include, for example, hard disk drives, floppy disk drives, tape drives, optical and magneto-optical drives, and compact disk drives. Although the present invention is illustrated by way of an exemplary magnetic hard disk drive 100, the invention can be used in other storage media and drives, including non-magnetic storage media, as apparent to one of ordinary skill in the art and without deviating from the scope of the present invention.

Figure 1:
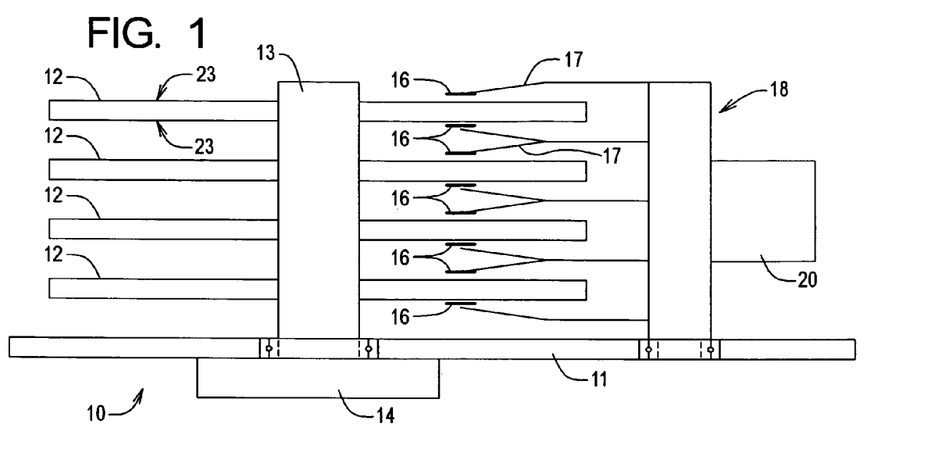
FIG. 1 is a highly diagrammatic view in elevation of a head-disk assembly (HDA) of a hard disk drive having one or more disk surfaces comprising magnetic storage media and control means for storing data according to principles of the present invention.
Figure 2:
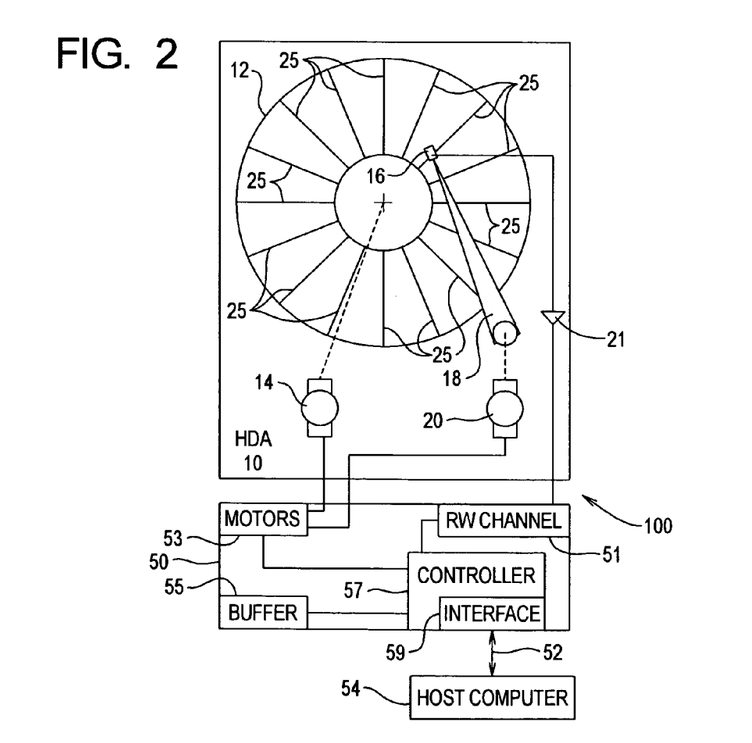
FIG. 2 is a diagrammatic electrical block diagram of a hard disk drive including the FIG. 1 HDA and showing an embedded controller for enabling storage of data on the disk surfaces in accordance with principles of the present invention.
Figure 3:
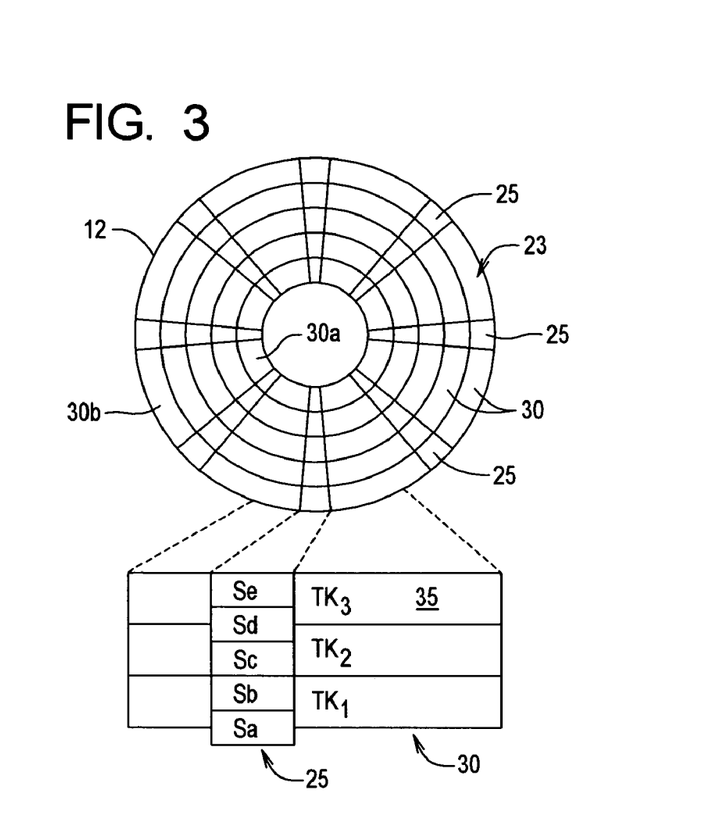
FIG. 3 is a diagrammatic view of a recording pattern defined on one or more of the disk surfaces of the FIG. 1 HDA in accordance with principles of the present invention.

Referring to FIGS. 1, 2 and 3, an exemplary hard disk drive 100 is diagrammatically depicted for storing user data and/or operating instructions for a computer system 54. The hard disk drive 100 comprises an electromechanical head-disk assembly 10 shown in FIG. 1 as including a base 11, one or more rotating data storage disks 12 mounted in a stacked, spaced-apart relationship upon a rotating spindle 13. The spindle 13 is rotated by a spindle motor 14 at a predetermined angular velocity lying in a range typically bounded by 5120 and 12,000 revolutions per minute.

Each disk 12 defines at least one, and usually two, media surfaces 23 coated with magnetic or other media for recording data. The spindle drive motor 14 turns the spindle 13 in order to move the disks 12 past magnetic heads 16 suspended by suspension arms 17 over each media surface 23. Generally, each magnetic head 16 is attached to the suspension arm 17 by a head gimbal assembly (not shown) that enables the magnetic head 16 to swivel to conform to the media surfaces on the disks 12. The suspension arms 17 extend radially from a rotary voice coil actuator 18 which is rotatably mounted to the base 11. An actuator motor 54 rotates the actuator 18 and head arms and thereby positions the magnetic heads 16 over the appropriate areas of the media surfaces 23 in order to locate and read or write data from or to the storage surfaces 23. Since the disks 12 rotate at relatively high speed, the magnetic heads 16 ride over the media surface 23 on a cushion of air (air bearing). Each magnetic head 16 comprises a read element (not shown) for reading magnetic data on magnetic storage media surfaces 23 and a write element (not shown) for writing data on the media surfaces 23. Most preferably, although not necessarily, the write element is inductive and has an electrical writing width which is wider than an electrical reading width of the read element, which is preferably of magnetoresistive or giant magnetoresistive material.

Referring to FIG. 3, each media surface 23 is divided into a plurality of concentric circular tracks 30 that each have individually addressable portions 35, such as sectors, in which data is stored in the form of magnetic bits. The data sectors 35 are separated by embedded narrow servo sectors or spokes 25 which contain head positioning information needed by a drive controller 57. The servo sectors or spokes 25 are written as tracks which include a series of phase-coherent digital fields followed by a series of constant frequency servo bursts. The servo bursts are radially offset and circumferentially sequential, and are provided in sufficient numbers such that fractional amplitude signals picked up by the read element from portions of at least two bursts passing under the read element enable the controller 57 to determine and maintain proper head position relative to a data track 30. One example of a servo burst pattern for use with an inductive write element/magneto-resistive read element head 16 is provided by commonly assigned U.S. Pat. No. 5,587,850 to Ton-that, entitled: "Data Track Pattern Including Embedded Servo Sectors for Magneto-Resistive Read/Inductive Write Head Structure for a Disk Drive", the disclosure thereof being incorporated herein by reference. Another example of a preferred servo wedge pattern and detection mechanism is disclosed in commonly assigned U.S. Pat. No. 5,862,005 to co-inventors Leis and Patapoutian, and others, entitled: "Synchronous Detection of Wide Bi-Phase Coded Servo Information for Disk Drive", the disclosure thereof being incorporated herein by reference.

The drive controller 57 controls operation of the pairs of magnetic heads 16 and media surfaces 23 to read and write data onto each media surface 23. The drive controller 57 preferably comprises an application specific integrated circuit chip which is connected by a printed circuit board 50 with other chips, such as a read/write channel chip 51, a motors driver chip 53, and a cache buffer chip 55, into an electronic circuit as shown in FIG. 2. The controller 57 preferably includes an interface 59 which connects to the host computer 54 via a known bus structure 52, such as ATA or SCSI.

The controller 57 executes embedded or system software comprising programming code that monitors and operates the controller system and drive 100. During a read or data retrieval operation, the computer system 54 determines the "address" where the data is located on the disk drive 100, i.e., the magnetic head number, the track 30, and the relevant portion(s) 35 of the track 30. This data is transferred to the drive controller 57 which maps the address to the physical location in the drive, and, and in response to reading the servo information in the servo sectors, operates the actuator motor 54 and suspension arm 17 to position a magnetic head 16 over the corresponding track 30. As the media surface 23 rotates, the magnetic head 16 reads the servo information embedded in each spoke 25 and also reads an address of each portion 35 in the track 30. When the identified portion 35 appears under the magnetic head 16, the entire contents of the portion 35 containing the desired data are read. In reading data from the media surface 23, the read element (not shown) senses a variation in an electrical current flowing through a magnetoresistive sensor of the read element (not shown) when it passes over an area of flux reversal on the surface 23 of the media. The flux reversals are transformed into recovered data by the read/write channel chip 51 in accordance with a channel algorithm such as partial response, maximum likelihood (PRML). The recovered data is then read into the cache memory chip 55 of the disk drive 100 from whence it is transferred to the computer system 54. The read/write channel 51 most preferably includes a quality monitor function which enables measurement of the quality of recovered data and thereby provides an indication of data error rate. One channel implementation which employs channel error metrics is described in commonly assigned U.S. Pat. No. 5,521,945 to Knudson, entitled: "Reduced Complexity EPR4 Post-Processor for Sampled Data Detection", the disclosure thereof being incorporated herein by reference. The indication of recovered data error rate is used in order to select linear data density, track density and/or error correction code levels, in accordance with principles of the present invention, as more fully explained hereinbelow.

Writing or storing data on the media surface 23 is the reverse of the process for reading data. During a write operation, the host computer system 54 remembers the addresses for each file on the media surface 23 and which portions 35 are available for new data. The drive controller 57 operates the actuator motor 54 in response to the servo information read back from the embedded servo sectors 25 in order to position a magnetic head 16 over a particular track 30, settles the head 16 into a writing position, and waits for the appropriate portions 35 to rotate under the head 16 to perform the actual writing of data. To write data to the media surface 23, an electrical current is passed through a write coil in the inductive write element (not shown) of the head 16 to create a magnetic field across a magnetic gap in a pair of write poles that magnetizes the magnetic storage media coating the media surface 23 under the head 16. When the track 30 is full, the drive controller 57 moves the magnetic head 16 to the next available track 30 with sufficient contiguous space for writing of data. If still more track capacity is required, another head 16 is used to write data to a portion 35 of another track 30 on another media surface 23.

Figure 4:
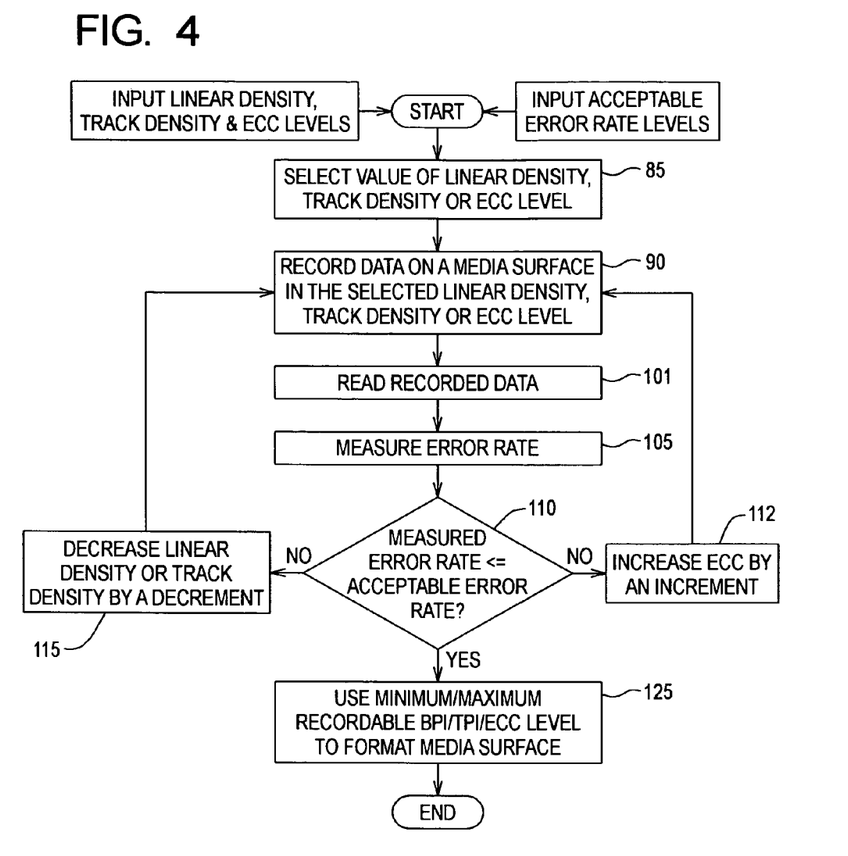
FIG. 4 is a flow chart illustrating the steps of an embodiment of the present method of increasing the data storage capacity and yield of disk drives having an error rate below a specified maximum error rate.

In one aspect, the present invention increases the data storage capacity and yield of data storage devices having a plurality of media surfaces 23, such as a hard disk drive 100 containing disks 12 covered with magnetic media. In one method, as illustrated in the flowchart of FIG. 4, one or more of linear data density, the TPI density, and the error code level for each portion 35 of a media surface 23 is individually selected by measurement to optimize the data storage capacity of that particular portion. Initially, values of linear density, TPI density, and error code levels are predefined and stored in a table of values that is input into the testing and formatting program. Generally, these values are incremental or decremental values of one another; for example, a maximum value or maxima of linear density of data can be the highest number in a series of five linear density values. The values of the linear data density can be a fixed number of preselected levels or can be derived from an algorithm that is based on a particular pair of a magnetic head 16 and media surface. The TPI can be a fixed number of preselected values or it can be continuously variable, depending on track radius or radial data track zone. In addition, an acceptable error rate value, which represents the greatest error rate that can be tolerated, is also input into the testing and formatting program.

In one version of the present invention, the linear density of data for each portion 35 of a media surface 23 of the disk drive 100 is optimized to provide the highest possible linear density for a particular magnetic pair of a head 16 and media surface 23. Although illustrated by an exemplary disk drive 100, this method can also be used to optimize storage on other storage devices. In a selection step 85, a first value for a linear density of data is selected for each portion 35 on the media surface 23 from a table of linear density values. Preferably, in a first iteration, the selected linear density is a maximum value for a pair of a magnetic head 16 and media surface 23. The maxima is calculated or estimated from statistically compiled data of measured linear densities for a population of pairs of magnetic heads 16 and media surfaces 23. It is preferred to start with the maximum linear density to provide the highest linear density value in each portion 35 of the media surface 23 in the fastest time, assuming that even the worst media surfaces 23 will have the density values closer to the maxima than the minima.

Thereafter, in a recording step 90, data is recorded in a portion 35 of one of the media surfaces 23 at the selected linear density by positioning a magnetic head 16 abutting the portion 35 of the media surface 23, and sending the appropriate signals to the write element (not shown) of the magnetic head 16. Typically, a sample of data of at least 1×103 bytes, and more preferably from about 1×105 to about 1×106 bytes, is recorded on the media surface 23 to obtain a statistically representative sampling of the error rate for the portion 35 of the media surface 23.

After the sample is recorded, the recorded data is read in a reading step 101 by the read element (not shown) of the magnetic head 16, and the data read is stored by the computer system 54 for evaluation. An error rate of the recorded data is measured or compiled by comparing the actual written data with the read data, element by element, in a measuring step 105. Suitable methods of determining the error rate include actual bit error measurement in which a bit of data read from the media surface 23 is compared with the correct bit, or a correct bit stream is compared with a measured bit stream. An alternative method is the mean square method in which a waveform read from the media surface 23 is compared with an ideal waveform to provide a quality metric. Of these methods, the mean square method is preferred because it takes significantly less time to determine the error rate of the media surface 23 or the quality of the measured signal. The measured error rate is then compared to a predetermined acceptable error rate in a determining step 110. The acceptable error rate is maximum error rate that can be tolerated for proper operation of the disk drive 100. Typically, acceptable error rates are less than about 1 incorrect byte in 500,000 bytes read, and more typically less than about 1 incorrect byte in 100,000 bytes read.

If the measured error rate is greater than the acceptable error rate, the linear density is decreased by a decremental value in a decrement step 115, and the newly derived linear density level is used to re-record data on the media surface 23. The newly written data is re-measured, and the new error rate measured and compared to the acceptable error rate. If the measured error rate is lower than the acceptable error rate, the entire portion 35 of the media surface is formatted in the formatting step 125, at the appropriate linear density level. Otherwise, the optimization process is repeated for successively lower levels of linear density, until the measured error rate is less than or equal to the acceptable error rate to provide the maximum recordable linear density of data for the portion 35 of the paired media surface 23 and the magnetic head 16. In this manner, each portion 35 of each track 30 of a media surface 23 is tested to find the highest possible linear density that provides a specified level of error rate performance. As an alternative to directly measured error rate, the error rate performance of the read channel can be inferred from error measurements or metrics otherwise available within the channel, such as the previously mentioned quality monitor function carried out within the read channel.

The linear density can also be varied both from one media surface 23 to another media surface 23 in the disk drive 100 (vertical zoning). In this method, generally a single linear density value is selected for an entire media surface 23. It is especially useful when a particular media surface 23 has a unique distribution and density of magnetic material. Although localized variations in recordable linear density across a media surface 23 would exist, such variations are small in comparison to the variation in linear density from one media surface 23 to another. Accordingly, one measured value of linear density for the entire media surface 23 would be sufficient to increase the storage capacity of the media surface 23.

The linear density can be changed by increasing the frequency with which write signals are sent to the write coil of the write element, or by changing the speed with which the media surface 23 is rotated under the magnetic head 16. Generally, the linear density of data is changed by varying the frequency with which the voltage or current of the write signals is sent to the write coil. For a media surface 23 rotating at a constant speed, a higher frequency of write signals produces smaller and more closely packed regions of data on the magnetic storage media of the media surface 23.

Figure 5:
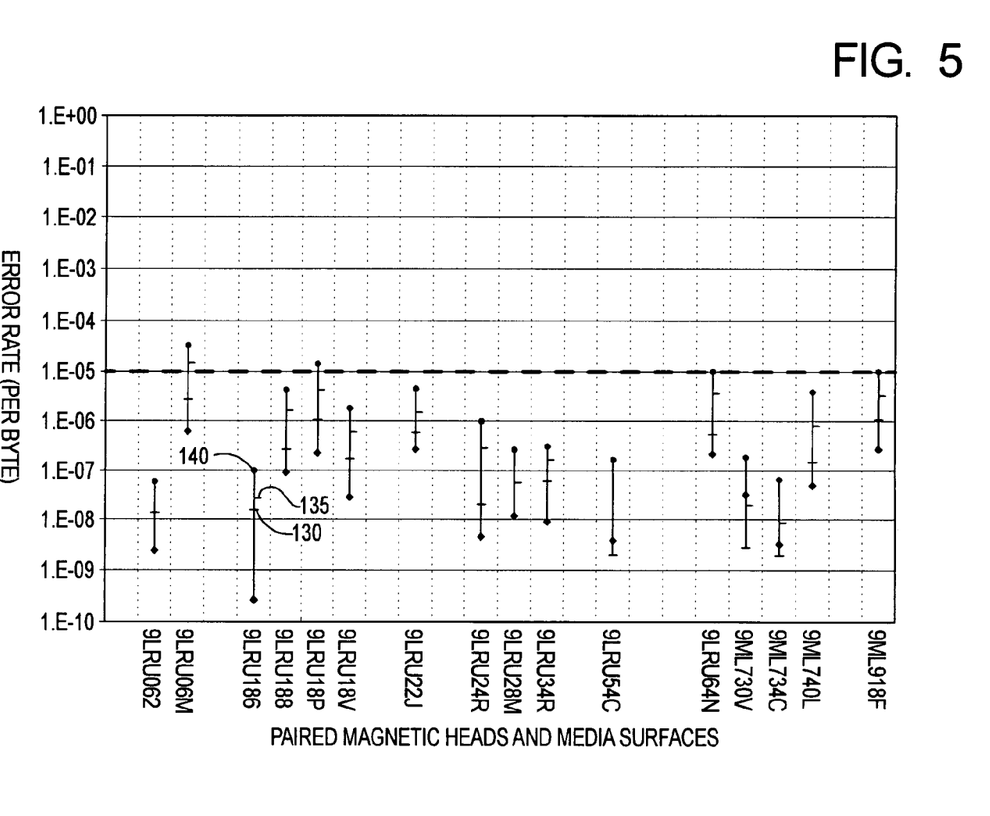
FIG. 5 is a chart illustrating the change in error rates for a population of pairs of magnetic heads and media surfaces as a function of linear density of data.

FIG. 5 illustrates the change in the error rate for a byte of data written and read by a population of pairs of magnetic heads 16 and media surfaces 23 as a function of increasing data density. In developing this figure, several pairs of magnetic heads 16 and media surfaces 23 were formatted and the error rate measured for linear data densities of 5, 10, and 100% over those of conventional formatting methods. Point 130 indicates the error level for a magnetic head and media surface pair having a density of 5% over that of conventional methods; point 135 is 10% higher, and point 145 is 100% higher. As shown, most of the pairs of magnetic heads 16 and media surfaces 23 can be formatted to have a linear density of 100% or higher than conventional methods and still maintain an error rate equal to or less than 1 in 100,000 bytes.

In another method, or concurrently with the linear density optimization method, a data track density (tracks per inch or "TPI") is also optimized across portions 35 of a single media surface 23. In the selection step 85, data is recorded on a portion of the media surface 23 at a selected TPI. The level of track density can be one of a fixed number of preselected levels or can be derived from an algorithm that is based on the location of a portion 35 of the media surface 23. Thereafter, the recorded data is read and an error rate of the recorded data is measured. The measured error rate is compared to an acceptable error rate, and if the measured error rate is greater than the maximum acceptable error rate, the previous steps are repeated for another track density value, for example, the originally selected value less a decrement. This process continues until the measured error rate is less than or equal to the acceptable error rate, to provide a maximum recordable track density of data for a particular portion 35 of the media surface 23.

Preferably, in the first iteration, the selected track density is a maximum value for the pair of magnetic head 16 and media surface 23. The maxima is calculated or estimated from statistically compiled data of measured track density for a population of pairs of magnetic heads 16 and media surfaces 23. It is preferred to start with the maximum track density to provide the highest track density value in each portion 35 of the media surface 23 in the fastest time, assuming again that worst media surfaces 23 will have a track density values closer to the maxima than the minima.

Because of a skew angle attributable to geometrical relationships between the surface 23 and the rotary actuator 18, track density values can be increased radially from the innermost tracks 30a near the center of a media surface 23 to the outermost tracks 30b near its periphery. This embodiment is particularly advantageous when the write frequency of linear density is maintained constant (i.e., the same number of portions 35 per track) because decreasing the width and spacing of the outermost tracks 30b provides a more efficient utilization of the media surface. While the outer tracks 30b have the same number of portions 35 as the inner tracks 30a, they can be made thinner in the radial direction and more closely spaced, thereby providing higher data storage capacities.

The track density can also be varied from one media surface 23 to another media surface 23. Track density is increased by decreasing either of the track width or the spacing between adjacent tracks 30. Preferably, the track density is varied by varying the spacing between adjacent tracks 30, because the width of the tracks 30 is determined by, and its variation limited to, the writing width or geometry of the write element of the magnetic head 16. The variations in track densities from one media surface 23 to another can be customized, or selected from the number of preselected levels of track density.

In a preferred method of determining the maximum recordable track density, the embedded servo sectors 25 are initially written on a media surface 23 during a factory servo-writing process at a servo track density that is higher than the data track density, as illustrated in FIG. 3. Servo bursts within each servo sector 35 are provided in such number and placement to enable accurate positioning of the magnetic head 16 in a full range of positions across the media surface 23, given the particular effective width and characteristics of the read element of a particular head (the read element width typically being narrower than the write element's writing width). In order to carry out the head positioning method, information in the embedded servo sector 25 is read by the magnetic head 16 and passed to the drive controller 57 which directs the actuator motor 20 to readjust the position of the suspension arm 16. This is important because high track densities require highly accurate positioning of the suspension arm 16, and the data track density cannot be greater than the servo track density. Generally, as shown in the FIG. 3 example, the servo track density is about 150% of the maximum possible data track density. In FIG. 3 five servo tracks Sa, Sb, Sc, Sd and Se are shown in relation to three data tracks Tk1, Tk2, Tk3. Servo track density is determined by determining the minimum read or write width of a population of magnetic heads 16. After writing the servo wedges 25 at the servo track pitch, the actual data tracks 30 can be written at any disk radial position between the servo tracks, not just at null positions where equal amplitudes are observed from two different servo bursts read from a servo wedge. Additional tests, as described above, are performed to determine the optimum data track density of the media surface 23.

Most preferably, every disk drive is servo written at the factory at a servo track density (servo TPI) which is sufficiently high to provide accurate positioning at any radius for the full range of acceptable read/write widths of the read and write elements of a particular head 16. Data track density (data TPI) is then decoupled from servo TPI by writing data tracks centered at non-null positions of the servo pattern. Micro-jog techniques are employed by the controller 57 in order to carry out the desired positioning over the data track locations. Initial servo TPI is determined by determining a minimum read element width of an acceptable population of heads (and also by determining a maximum write width of the same acceptable population, if untrimmed servo bursts are employed in each servo sector 25). It is possible that more servo bursts are required to ensure adequate linearity of a servo position error signal (PES) derived by reading relative burst amplitudes at any particular disk radius for a worst case read element and head.

While a servo track density is presently preferred to be approximately 150% of the data TPI, the present method may benefit from increasing servo TPI relative to average data TPI to ensure that a read element on the narrow end of the distribution has sufficient width of linear response to provide a useable PES for use by the controller 57.

Following the factory servowriting process, additional time during drive self-scan is needed to determine the optimum data TPI for each data surface 23. One preferred method is to perform "747" measurements that can be used to determine the optimum track pitch. (The expression "747" comes from a similarity in appearance between a resultant data plot and an elevational outline of the Boeing model 747 airplane.) The head is moved off track until the error rate exceeds a chosen threshold. The distance to failure is called off track capability. This process is repeated with adjacent tracks written at smaller spacing until the off track capability drops to zero. The resulting data for off track capability versus track pitch can then be analyzed to determine the optimum track pitch, typically chosen as the track pitch with maximum off track capability. This process is described in more detail in an article by R. A. Jensen, J. Mortelmans, and R. Hauswitzer, entitled: "Demonstration of 500 Megabits per Square Inch with Digital Magnetic Recording", IEEE Trans. on Magnetics, Vol. 26, No. 5, Sep. 1990, p. 2169 et seq. However, a simple in-drive erase width measurement may also be used to determine suitable data TPI.

In yet another embodiment, the level or degree of the error code is varied across a single media surface 23, or the error code is varied from one media surface 23 to another with a constant error code for a particular media surface 23. By error code it is meant error detection and correction procedures using parity bits or cyclic redundancy bits for each block of data stored. A parity bit is a bit added to an array of bits or a byte to provide an odd or even value as a method of detecting errors. Cyclic redundancy bits are bits in each portion 35 or sector that are repeated and that are used to identify incomplete or faulty data. In one exemplary process, an error code level of data is selected for a potion of a media surface 23 and data is recorded on the media surface 23 at the selected error code level. Thereafter, the recorded data is read, an error rate of the recorded data is measured, and the measured error rate is compared to an acceptable error rate, as at step 110 in the FIG. 4 flow diagram. If the measured error rate is greater than the acceptable error rate, the error code level is incremented at a step 112 in FIG. 4 and the previous steps 90, 101, 105 and 110 are repeated for another higher error code level which is the original value plus an increment in error code level, until the measured error rate is less than or equal to the acceptable error rate. This provides a minimum recordable error code level of data for that portion 35 of the media surface 23. Thereafter, the drive controller 57 is programmed to use the minimum recordable error code level for that portion 35 of the media surface 23.

Preferably, in the first iteration, the selected error code level is a minimum value for a paired magnetic head 16 and media surface 23. The minima is calculated or estimated from statistically compiled data of acceptable levels of error code for the same types of pairs of magnetic heads 16 and media surfaces 23. It is preferred to start with the minimum value to provide the highest areal density in each portion 35 of the media surface 23, because the higher the error code level the less data is stored on the media surface 23.

In an alternative embodiment, the error code can be varied from one media surface 23 to another with a single level of error code used for a particular media surface 23, using the same principles of operation as described above. By minimizing the level of error code used, the number of redundant bits stored on the media surface 23 is also reduced freeing more space for data storage. In yet another embodiment, each media surface 23 is assigned one or more levels of error code based on the maximum track density and/or linear density previously determined for the media surface 23. This embodiment has the advantages of providing the increase in data storage capacity realized by optimizing error code levels for a particular surface 23, while reducing the time needed to qualify the disk drive 100.

Figure 6:
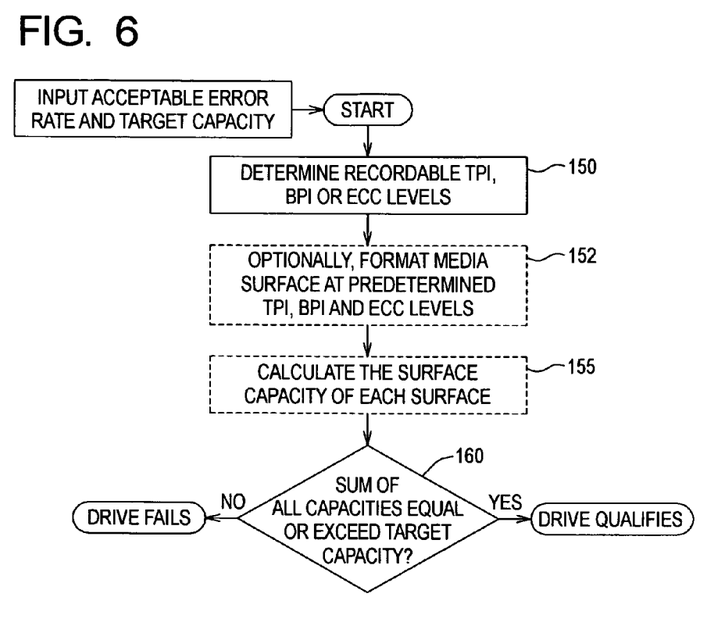
FIG. 6 is a flow chart illustrating the steps of a method of increasing the yield of disk drives having a specified minimum capacity.

The optimized linear density, track density and error code levels determined according to the present method can also be used to optimize the yield or "qualifying pass rate" of the data storage devices 10. The flowchart of FIG. 6 illustrates an implementation of this process for increasing the yield and data storage capacity of a data storage device 10 having a plurality of media surfaces 23. In this method, in a determining step 150 at least one of a maximum recordable linear density of data, maximum track density of data, or minimum error code level of data is determined for each media surface 23 using the method described above. Optionally, the media surface is formatted using the predetermined maxima of linear density and track density, or minima of error correction code level in an optional formatting step 152. Then, in a calculation step 155 the surface capacity of each media surface 23 is calculated from the measured, maximum recordable track density, maximum recordable linear density, or minimum error code level. The surface capacity is described by the equation:

$$\frac{TPI \times BPI \times (1 + ECC)}{FE}$$

where TPI is the track density, BPI is the linear density, ECC is the fractional level of error correcting code used which is typically about 0.1, and FE is the format efficiency which is typically about 0.57.

After each media surface 23 has been formatted, the calculated surface capacities of all formatted surfaces 23 are summed in a summing step 160 to determine the device capacity, which is the storage capacity of the entire data storage device 100. If the device capacity equals or exceeds a target or desired storage capacity, the data storage device 100 is passed, and it is not necessary to determine optimal TPI, BPI, and ECC levels for any more media surfaces 23. However, if the sum of the capacities of all measured surfaces does not equal or exceed the target capacity, it is determined if all surfaces 23 have been measured. If all the media surfaces 23 have not been measured, the surface capacity of the next media surface 23 is determined, and the device capacity recalculated. If all surfaces 23 have been measured or optionally formatted and the device capacity is still less than the target capacity, the data storage device 100 is failed. After the disk drive 100 is qualified, testing ends, and the drive controller 57 is programmed for the appropriate track density and linear density for formatting each media surface 23. The drive controller 57 is also programmed to apply a measured or calculated level of error code to each media surface 23 during formatting.

In another aspect, the present invention is directed to a data storage device 100 comprising one or more pairs of media surfaces 23 that have been formatted to maximize surface capacity. The media surfaces 23 are capable of storing data, and the magnetic heads 16 are capable of reading and writing data in a portion 35 of the media surfaces 23. The drive controller 57 controls each magnetic head 16 for reading and writing data in the portion 35 of the media surfaces 23. Preferably, to optimize the storage capacity and yield of the data storage device 100, the controller 57 is programmed to write data on the media surface 23 at a predetermined recordable track density, linear density, or error code level of data, one or more of which is measured. Preferably, the controller 57 is programmed to write data on each portion of the media surface 23 at a plurality of recordable track density, linear density, or error code levels of data. Most preferably, the controller 57 is programmed to write data on each portion of the media surface 23 at a maximum recordable track density, a maximum recordable linear density of data, or a minimum recordable error code level of data, each of which is measured for a paired head 16 and media surface 23.

These maximum or minimum values or levels of track density, linear density, and error code level of data, are measured by (1) selecting for a media surface 23, one or more values of a linear density of data, a track density of data, or an error code of data, (2) recording data on the media surface 23 at the linear density, track density, or error code level, (3) reading the data recorded on the media surface 23 and measuring an error rate of the recorded data, and (4) comparing the measured error rate to an acceptable error rate, and if the measured error rate is greater than the acceptable error rate, repeating steps (2) to (4) for another linear density, track density, or error code level, until the measured error rate is less than or equal to the acceptable error rate, to determine a recordable linear density, track density, or error code level of data for each portion of the media surface 23. This approach is particularly useful for embodiments in which the controller 57 records data in media surfaces 23 comprising a plurality of concentric tracks 30 with portions 35 in the tracks 30.

In one version, the data storage device comprises a magnetic media storage device, such as a disk drive 100, having a plurality of pairs of magnetic heads 16 abutting media surfaces 23, as shown in FIG. 1. The media surfaces 23 comprise magnetic media on disks 12. A controller 57 provides signals to the magnetic heads 16 for reading and writing data on a plurality of portions 35 of the media surface 23. The controller 57 is programmed to write data on each portion 35 of the media surface 23 at a maximum recordable track or linear density of data, or a minimum recordable error code level of data, each of which is measured for pairs of magnetic heads 16 and media surfaces 23. The yield of disk drives 100 is increased by optimizing the recordable surface capacity of each media surface 23. A disk drive 100 fails qualification only if the total sum of all surface capacities of the media surfaces 23, which are formatted to their optimal levels, is less than the desired target device capacity. Unlike conventional methods of formatting, failure of a single or even a couple of media surfaces 23 in a particular disk drive 100 will not disqualify the entire drive.

Another advantage of this method over conventional methods is that it is not necessary to repeatedly format and test each media surface 23 in the disk drive 100. Once a certain device capacity has been reached, all remaining surfaces can be formatted and tested at minimum capacity levels to achieve the desired target device capacity. For example, for a disk drive 100 having four surfaces 23 and a target capacity of 4.4 Gbyte, once two surfaces 23 have been formatted at a higher density of 1.4 Gbyte, the remaining surfaces 23 can be formatted at 0.8 Gbyte without being tested at the higher density.

In another aspect, the present invention is directed to more efficient methods of formatting data storage devices that simplify the optimized formatting method in which surface capacity is varied for each media surface 23 and still increases the yield or device capacity of the data storage device. In the finite surface capacity method, each media surface 23 is allocated a particular surface capacity from a set or series of predetermined surface capacities—instead of measuring the optimal or maximum surface capacity value for that media surface 23. During formatting or testing, each media surface 23 is tested at the highest predetermined surface capacity available in the set. If the error rate from the test is not satisfactory, then the media surface 23 is tested at the next lower predetermined surface capacity from the set. This testing process is repeated for lower and lower predetermined surface capacities until the largest possible surface capacity that provides an acceptable error rate is determined. The media surface 23 is then allocated this surface capacity, and another media surface 23 is tested, starting with the highest surface capacity in the predefined set.

The order in which different predetermined surface capacities of the set are tested for each media surface 23 can be descending or ascending. Alternatively, an algorithm that estimates a probable surface capacity for the disk, based on the measured error rate in the first iteration of the formatting process, can be used to further optimize the testing and formatting method. For example, a "half stepping" technique can be used in which subsequently tested surface capacities are about 50% higher or lower than the previously tested surface capacities. If measured surface capacity of a media surface 23 does not provide an acceptable error rate at any of the predetermined surface capacities in the set, there are two options: assign a zero surface capacity value to that particular media surface 23 and proceed to test the next media surface 23, or disqualify the data storage device 10 if the remaining surface capacities of the other media surfaces 23 will not provide the desired device capacity. After repeating the testing process for each media surface 23 the values of all the assigned surface capacities are added to determine whether the total sum is equal to or exceeds a target drive capacity. If the sum of all surface capacities is less than the target drive capacity, the data storage device fails the test.

In a second method, known as a predetermined surface distribution method, the total device capacity is divided by the number of media surfaces 23 to predetermine a number of possible surface capacities that can be summed to achieve the desired device capacity. Each of these separate sets of possible surface capacities is used in the testing method. For example, a disk drive 100 having a desired device capacity of 4 Gigabyte and four disk surfaces, can be split into a set of 1 GB for each disk, or 1.2 GB for three disks and 0.4 for the last disk, or 0.8 GB for two disks and 1.2 GB for the other two disks. During testing, each media surface 23 is tested at the highest predetermined capacity in the set. If the error rate of the media surface 23 for the selected surface capacity is not satisfactory, then the disk surface is tested at the next predetermined surface capacity in the set. When a required number of media surfaces 23 are measured and associated with a larger surface capacity in the set, then the remaining disks can be assigned to the smaller surface capacity values in the set and may not require testing at all. Again, when a media surface 23 fails at all of the predetermined surface capacities there are two options, either assign a zero capacity value to that media surface 23 and proceed to the next media surface 23, or disqualify the whole disk drive 100. After all surfaces 23 have been formatted, the assigned surface capacities for the media surfaces 23 are added, and if the sum exceeds or is equal to the target drive capacity, the particular drive 100 is passed; otherwise the drive is failed.

These simplifications achieve a compromise between increasing the efficiency of the testing/formatting method and the increase in device capacity or yield. In the relative order of efficiency of formatting, the conventional method is the easiest to implement, followed by the predetermined surface distribution method, the finite surface capacities method, and thereafter, the method in which surface capacity is optimized for each surface. However, for increasing capacity or yield, it is the inverse order.

Figure 7:
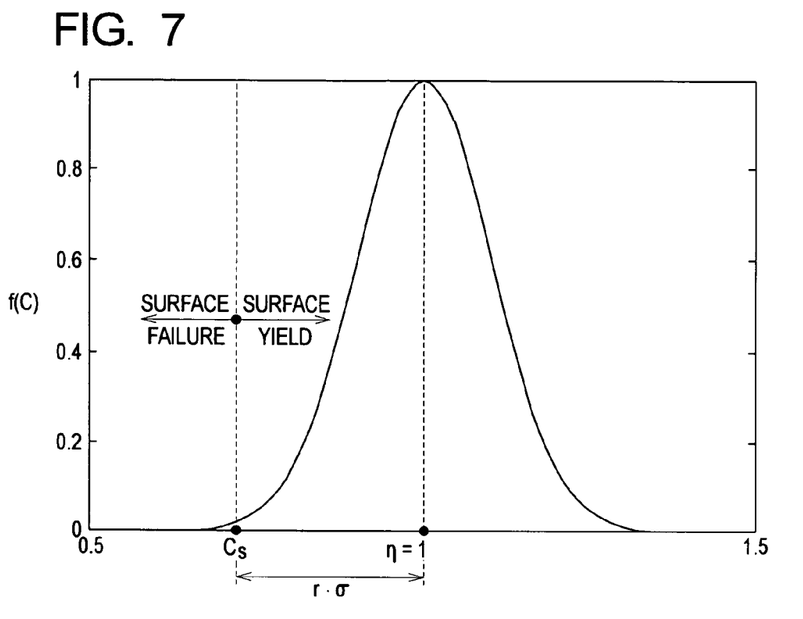
FIG. 7 is a standard Gaussian curve that approximates the distribution of surface capacities for a hypothetical population of pairs of media surfaces and magnetic heads having a mean surface capacity of 1.

The following simulation illustrates the increase in the device capacity for a data storage device 10 having a specified error rate level, and the increase in the yield of data storage devices 10 having a specified device capacity. The projected gain in yield or device capacity in these examples was derived from a statistical analysis of surface capacities measured for a representative sample of pairs of magnetic heads 16 and media surfaces 23 of 3.5" hard disk drives manufactured by Quantum Corporation. For purposes of this analysis a hypothetical population of pairs of magnetic head 16 and media surfaces 23 having a mean surface capacity of 1 and a standard deviation approximated by a standard Gaussian curve was assumed, as shown in FIG. 7.

Two values of standard deviation are used in these examples, because the standard deviation of the surface capacities within a device affects the potential gain in capacity achieved by the present process. The larger the standard deviation, the larger the potential gain in yield or capacity of the present process. In a first set of examples as illustrated in Table 1, a standard deviation equal to 0.05 times the mean, which is thought to be a conservative estimate, is assumed. In a second set of examples, illustrated in Table 2, a standard deviation equal to 0.1 times the mean was assumed. Note that in the following discussion the mean surface capacity is taken as equal to 1. Because the standard deviation is expressed in terms of the mean, the simulated results are readily scalable to any specified drive capacity by multiplying the results by the desired drive capacity.

Table 1 illustrates the increase in drive capacity for media surfaces 23 tested and operated by the present process, where N equals the number of media surfaces 23 per drive, M equals the number of predetermined capacity levels, and R equals the number of standard deviations below the mean of drives that passed. For example, for a disk drive 100 comprising 5 disks 12 (N=10) in which all the media surfaces 235 were formatted to one of two predetermined surface capacities (M=2), and in which all media surfaces 23 within 3 standard deviations (R=3), the drive capacity is increased by 5.8% as compared to conventional techniques. The greater the number of disks 12 the greater the improvement in capacity realized by the present method. A disk drive 100 having 24 media surfaces (N=24), all within 3 standard deviations of the mean (R=3), and each formatted to provide 1 of 4 predetermined areal densities (M=4) achieves 10.6% more capacity than the same drive formatted by conventional methods.

TABLE I

| capacity gain (%) | N = 2 | N = 4 | N = 6 | N = 8 | N = 10 | N = 12 | N = 54 | N = 24 |
|---|---|---|---|---|---|---|---|---|
| M = 2 R = 2.5 | 2.3 | 3.4 | 4.2 | 4.7 | 5.1 | 5.3 | 5.9 | 6.1 |
| M = 2 R = 3 | 2.9 | 4.1 | 5.3 | 5.8 | 6.2 | 6.7 | 7.5 | 7.6 |
| M = 4 R = 2.5 | N/A | 5.0 | 6.1 | 6.7 | 7.1 | 7.6 | 8.5 | 8.7 |
| M = 4 R = 3 | N/A | 6.0 | 7.3 | 8.1 | 8.6 | 9.1 | 10.3 | 10.6 |

Table 1 illustrates the increase in surface capacity for disk drives 100 in which the standard deviation is equal to 0.10 times the mean, which is a more accurate estimate of the standard deviation. The change in drive capacity is even more significant because of the larger assumed standard deviation. As before the greatest gains occur in the disk drives 100 having as many as twenty-four surfaces 23, each of which is formatted to provide 1 of 4 predetermined areal densities. For example, a disk drive 100 having twenty-four media surfaces (N=24), all within 3 standard deviations of the mean (R=3), and each formatted to provide 1 of 4 predetermined areal densities (M=4), has 23.9% more capacity than the same drive formatted by the conventional method.

TABLE II

| capacity gain (%) | N = 2 | N = 4 | N = 6 | N = 8 | N = 10 | N = 12 | N = 54 | N = 24 |
|---|---|---|---|---|---|---|---|---|
| M = 2 R = 2.5 | 5.3 | 8 | 9.8 | 11 | 11.9 | 12.4 | 13.8 | 14.3 |
| M = 2 R = 3 | 7.1 | 10 | 12.9 | 14.1 | 100.1 | 16.2 | 18.1 | 18.6 |
| M = 4 R = 2.5 | N/A | 11.7 | 14.2 | 100.7 | 16.7 | 17.6 | 19.7 | 54.4 |
| M = 4 R = 3 | N/A | 14.6 | 17.9 | 19.8 | 21.0 | 22.1 | 23.0 | 23.9 |

In another simulation, the effect of the present invention on the probability of failure of a disk drive 100 as a function of drive capacity is illustrated. Generally, drive capacity $C_d$ is a function of the number of media surfaces 23 in the disk drive 100. For conventional disk drives in which all media surfaces are formatted for the same surface capacity $C_s$, the drive capacity $C_d$ is equal to the number of media surfaces per drive n times a specified surface capacity $C_s$ or ($C_d = n \times C_s$). In addition, as explained above, as surface capacity and data density increases the error rate for the surface increases. Thus, for conventional disk drives in which the entire disk drive is failed when one or more disks do not meet the qualifying error rate levels, the probability of failure of the disk drive is described by the equation $$F_d = 1 - Q^n\left(\frac{C_d - n\eta}{n\sigma}\right)$$

where $C_d$ is a target drive capacity, n is the number of media surfaces 23, $\eta$ is the mean surface capacity and $\sigma$ is the standard deviation for a population of pairs of magnetic heads 16 and media surfaces 23, and where the probability that a surface qualifies, Q(x), is given by equation (2):

$$Q(x) = \frac{1}{\sqrt{2\Pi}} \int_x^\infty e^{-\alpha^2/2} d\alpha$$

In disk drives 100 formatted by the present invention the drive capacity $C_d$ is determined from the sum of the individual surface capacities of each media surface in the disk drive 100, i.e., $C_d = C_{s1} + C_{s2} + C_{s3} \ldots + C_{sn}$ for a disk drive 100 having n media surfaces 23. Moreover, the disk drive 1100 fails only when the drive capacity $C_d$ is less than a specified capacity. Thus, the probability of failure to a disk drive 100 formatted by the present invention is described by the equation (3):

$$F_d = 1 - Q\left(\frac{C_d - n\eta}{\sqrt{n}\ \sigma}\right)$$

where $C_d$ is a target capacity of the drive, n equals the number of media surfaces 23, $\eta$ and $\sigma$ equal the surface capacity statistics, and Q is the probability that a surface qualifies, as given by equation 2 above.

Figure 8:
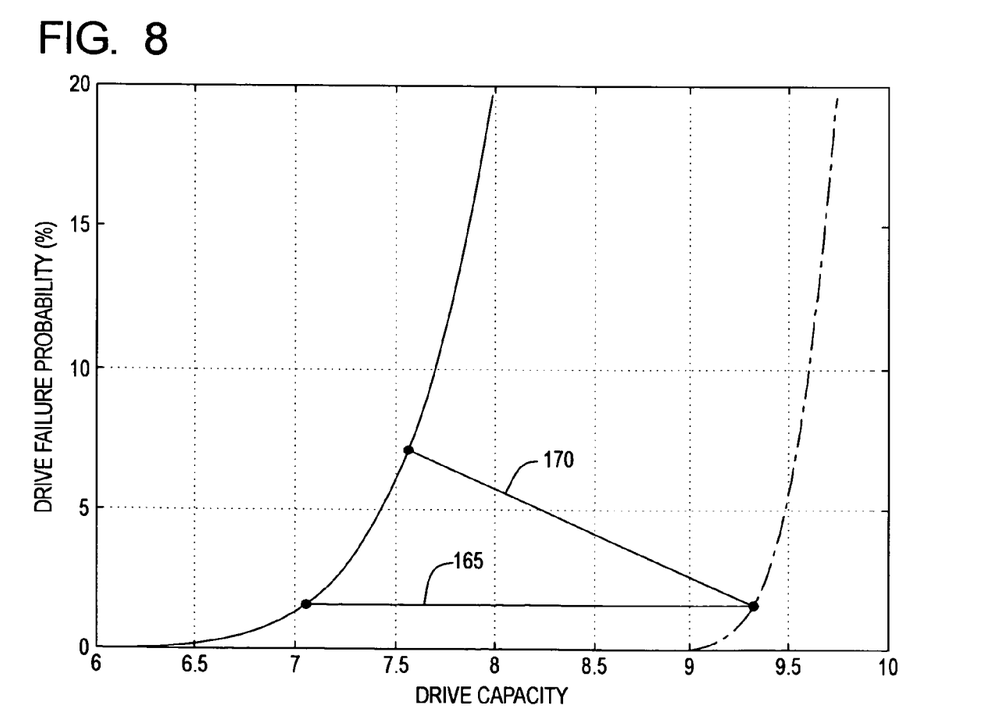
FIG. 8 is an illustration of two examples of the effect of the present invention on the probability of drive failure as a function of drive capacity.

FIG. 8 shows the probability of drive failures as a function of increasing drive capacity, as predicted by equations 1 and 3. These curves were calculated for drives having ten media surfaces 23 (n=10) with a mean capacity of 1 ($\eta$=1) and standard deviation of 0.1 ($\sigma$=0.1). In the first example, illustrated by the line 165, a disk drive 100 which would have a drive capacity of 7.13 and a probability of failure of 2% when formatted using conventional techniques, is found to have a much higher drive capacity of 9.35 when formatted using the method of the present invention. This represents an improvement of about 30% with no increase in probability of failure. In the second example, illustrated by the line 170, a disk drive 100 having a capacity of 7.6 and a probability of failure of 7%, is increased in capacity by about 23% to 9.35 and the probability of failure is reduced to 2%.

Thus the present invention is capable of increasing a data storage capacity of data storage devices such as disk drives 100 having a plurality of media surfaces 23 by compensating for the storage inefficiencies of particular pairs of magnetic heads 16 and media surfaces 23. Because the surface capacity of the media surface 23 depends on the areal density of the bits recorded on the media surface 23, larger surface capacity is obtained for each media surface 23 using the present method. The higher areal density is proportional to the higher track density and the higher linear density of the data that can be written to and read from each portion 35 of each track 30 on the media surface 23. Usable surface capacity is further enhanced by the minimizing the level of error code used to format a media surface 23, which minimizes the addition of extra parity bits or redundant bits for each byte or logical block of data that is stored. By usable surface capacity it is meant the number of bits of user data which can be stored on a surface 23, as opposed to the total number of bits which can be stored on a media surface 23. Although the total number of bits stored on a media surface 23 is unaffected by the level of error code used, the amount of data which can be stored can be reduced from about 5 to about 23%. Thus, by using the minimal level of error code for each surface 23, the data storage capacity of data storage devices such as drives 100 is increased compared to conventional techniques.

The present method also provides more data storage than conventional methods, in which all media surfaces 23 in a disk drive 100 formatted using the same track density, linear density, and level of error code, especially since these values were typically selected to ensure that fewer than 10% of the pairs of magnetic heads 16 and media surfaces 23 actually failed qualification tests. The present method allows each media surface 23 to have an optimized storage capacity related to its maximum recordable linear density, track density and error code level. Thus, the entire data storage device 10 has a greater probability of meeting target capacity levels.

The present invention has been described in considerable detail with reference to preferred versions that are provided only to illustrate the invention and should not be used to limit the scope of the invention. For example, the present invention can also be used in other fixed or removable disk drives 100 operating on other principles, such as writeable optical or magneto-optical disks or re-writeable optical disks or CDs. In yet another example, the present process is also useful for magnetic hard disk drives 100 in which the inflexible platters are made of a highly smooth material, such as glass, that enables the magnetic heads 16 to make contact with the media surface 23 providing even more densely packed data on the storage surface.

What is claimed is:

1. A method of increasing a data storage capacity of a data storage device having a media surface, the method comprising the steps of:
   (a) selecting a linear density of data and recording data in the selected linear density on a portion of the media surface;
   (b) reading the recorded data and measuring a metric indicative of error rate of the recorded data; and
   (c) comparing the measured metric to a reference metric indicative of acceptable error rate, and if the measured metric is greater than the reference metric, repeating steps (a) to (c) for the selected linear density less a decrement, until the measured metric is less than or equal to the reference metric, to determine a recordable linear density of data for the portion of the media surface.

2. The method of claim 1 wherein in the first iteration of step (a), the selected linear density is selected to be an estimated maxima of linear density of data for the portion of the media surface.

3. The method of claim 1 further comprising the steps of repeating steps (a) to (c) for each portion of the media surface.

4. The method of claim 1 further comprising the steps of repeating steps (a) to (c) for a plurality of media surfaces in the data storage device.

5. The method of claim 4 further comprising the steps of calculating a surface capacity of data for each media surface from the recordable linear density of data for that media surface.

6. The method of claim 5 further comprising the steps of summing the surface capacities of the media surfaces to determine a device capacity, and qualifying the data storage device if the device capacity is higher than a target capacity.

7. The method of claim 1 further comprising the steps of:
   (1) selecting a track density of data and recording data in the selected track density on the portion of the media surface;
   (2) reading the recorded data and measuring an error rate of the data; and
   (3) comparing the measured error rate to an acceptable error rate, and if the measured error rate is greater than the acceptable error rate, repeating steps (1) to (3) for the selected track density less a decrement, until the measured error rate is less than or equal to the acceptable error rate, to determine a recordable track density of data for the portion of the media surface.

8. The method of claim 1 further comprising the steps of:
   (1) selecting an error code level of data and recording data at the selected error code level on the portion of the media surface;
   (2) reading the recorded data and measuring an error rate of the recorded data; and
   (3) comparing the measured error rate to an acceptable error rate, and if the measured error rate is greater than the acceptable error rate, repeating steps (1) to (3) for the selected error code level plus an increment in error code level, until the measured error rate is less than or equal to the acceptable error rate, to determine a recordable error code level for the portion of the media surface.

9. The method of claim 1 wherein step (a) comprises the step of selecting a linear density of data for a media surface comprising a disk surface of a disk drive.

10. A data storage device comprising:
    a media surface having a linear density of data that is determined by: (a) selecting a linear density of data, recording data on a portion of the media surface at said density, (b) reading the recorded data, measuring a metric indicative of error rate of the recorded data, and (c) comparing the measured metric to a reference metric indicative of an acceptable error rate, and if the measured metric is greater than the reference metric, repeating steps (a) to (c) for the selected linear density less a decrement, until the measured metric is less than or equal to the reference metric, thereby determining a recordable linear density of data for the portion of the media surface.

11. A method of increasing a data storage capacity of a data storage device having a media surface, the method comprising the steps of:
    (a) selecting a track density of data and recording data in the selected track density on a portion of the media surface;
    (b) reading the recorded data and deriving a quality metric indicative of an error rate of the recorded data; and
    (c) comparing the quality metric to a reference metric indicative of an acceptable error rate, and if the quality metric indicates an error rate greater than an acceptable error rate indicated by the reference metric, repeating steps (a) to (c) for the track density less a decrement, until the quality metric indicates an error rate less than or equal to the acceptable error rate, to determine a recordable track density of data for the portion of the media surface.

12. The method of claim 11 wherein in the first iteration of step (a), the selected track density is selected to be an estimated maxima of track density for the media surface.

13. The method of claim 11 further comprising the steps of repeating steps (a) to (c) for each portion in the media surface.

14. The method of claim 11 further comprising the steps of repeating steps (a) to (c) for a plurality of media surfaces in the data storage device.

15. The method of claim 14 further comprising the steps of calculating a surface capacity of each media surface from the recordable track density of each media surface.

16. The method of claim 11 further comprising the steps of summing the calculated surface capacities of each media surface to derive a device capacity, and qualifying the data storage device if the device capacity is higher than a target capacity.

17. The method of claim 11 further comprising the steps of:
(1) selecting a linear density of data and recording data in the selected linear density on the portion of the media surface;
(2) reading the recorded data and deriving the quality metric; and
(3) comparing the quality metric to the reference metric indicative of an acceptable error rate, and if the quality metric indicates an error rate greater than an indicated acceptable error rate, repeating steps (1) to (3) for the selected linear density less a decrement, until the quality metric indicates an error rate less than or equal to the indicated acceptable error rate, to determine a recordable linear density of data for the portion of the media surface.

18. The method of claim 11 further comprising the steps of:
(1) selecting an error code level of data and recording data in the selected error code level on a portion of the media surface;
(2) reading the recorded data and developing a quality metric indicative of an error rate of the recorded data; and
(3) comparing the quality metric indicated error rate to an acceptable reference metric, and if the quality metric indicates an error rate greater than the acceptable reference metric, repeating steps (1) to (3) for the selected error code level plus an increment in error code level, until the quality metric indicates an error rate less than or equal to the acceptable reference metric, to determine a recordable error code level for the portion of the media surface.

19. The method of claim 11 wherein step (a) comprises the step of selecting a track density of data comprising a number of tracks per unit radial length for a media surface comprising a disk surface of a disk drive.

20. The method of claim 11 wherein the media surface has a series of radially extending servo wedges written at a fixed servo track density and having servo bursts and further being interleaved between sectors of data tracks, and wherein at least some of the data tracks written at a selected data track density are written at servo burst non-null radial positions.

21. A data storage device comprising:
a media surface having a track density of data that is determined by: (a) selecting a track density of data, recording data on a portion of the media surface at said density, (b) reading the recorded data, deriving a quality metric indicative of an error rate of the recorded data, and (c) comparing the quality metric to a reference metric indicative of an acceptable error rate indicated by the reference metric, and repeating steps (a) to (c) for the track density less a decrement, until the quality metric indicates an error rate less than or equal to the acceptable error rate, thereby determining a recordable track density of data for the portion of the portion media surface.

22. A method of increasing a data storage capacity of a data storage device having a media surface, the method comprising the steps of:
(a) selecting an error code level of data and recording data in the error code level on a portion of the media surface;
(b) reading the recorded data and measuring an error rate of the recorded data; and
(c) comparing the measured error rate to an acceptable error rate, and if the measured error rate is greater than the acceptable error rate, repeating steps (a) to (c) for the error code level plus an increment in error code level, until the measured error rate is less than or equal to the acceptable error rate, to determine a recordable error code level of data for the portion of the media surface.

23. The method of claim 22 wherein in the first iteration of step (a), the selected error code level is selected to be an estimated minima of an error code level of data.

24. The method of claim 22 further comprising the steps of repeating steps (a) to (c) for each portion in the media surface.

25. The method of claim 22 further comprising the steps of repeating steps (a) to (c) for a plurality of media surfaces in the data storage device.

26. The method of claim 25 further comprising the steps of calculating a surface capacity of each media surface from the recordable error code level for each media surface.

27. The method of claim 26 further comprising the steps of summing the calculated surface capacities of each media surface to derive a device capacity, and qualifying the data storage device if the device capacity is higher than a target capacity.

28. The method of claim 22 further comprising the steps of:
(1) selecting a linear density of data and recording data in the linear density on the portion of the media surface;
(2) reading the recorded data and measuring an error rate of the data; and
(3) comparing the measured error rate to an acceptable error rate, and if the measured error rate is greater than the acceptable error rate, repeating steps (1) to (3) for the selected error rate less a decrement, until the measured error rate is less than or equal to the acceptable error rate, to determine a recordable linear density of data for the portion of the media surface.

29. The method of claim 22 further comprising the steps of:
(1) selecting a track density of data and recording data in the selected track density on the portion of the media surface;
(2) reading the recorded data and measuring an error rate of the recorded data; and
(3) comparing the measured error rate to the acceptable error rate, and if the measured error rate is greater than the acceptable error rate, repeating steps (1) to (3) for the track density less a decrement, until the measured error rate is less than or equal to the acceptable error rate, to determine a recordable track density of data for the portion of the media surface.

30. The method of claim 22 wherein step (a) comprises the step of selecting a minimum error code level for a media surface comprising a disk surface of a disk drive.

31. A data storage device comprising:
a media surface having a recordable error code level determined by: (a) selecting an error code level of data, recording data in the error code level on a portion of the media surface, (b) reading the recorded data and measuring an error rate of the recorded data, and (c) comparing the measured error rate to an acceptable error rate, and if the measured error rate is greater than the acceptable error rate, repeating said steps (a) to (c) for the error code level plus an increment in error code level, until the measured error rate is less than or equal to the acceptable error rate, to determine a recordable error code level of data for the portion of the media surface.

32. A method of increasing a data storage capacity of a data storage device having a media surface, the method comprising the steps of:
(a) selecting for a portion of the media surface, one or more of a linear density of data, a track density of data, or an error code level of data;
(b) recording data on the portion of the media surface at the selected linear density, track density, or error code level;
(c) reading the recorded data and developing an error metric indicative of an error rate of the recorded data; and
(d) comparing the error metric indicated error rate to a reference metric indicative of an acceptable error rate, and if the indicated error rate is greater than the acceptable error rate, repeating steps (b) to (d) for another linear density, track density, or error code level, until the indicated error rate is less than or equal to the acceptable error rate, to determine a recordable linear density, track density, or error code level of data for the portion of the media surface.

33. The method of claim 32 wherein in step (a), the selected linear density and track density are estimated maxima levels for the media surface, and the selected error code level is an estimated minima level for the media surface.

34. The method of claim 32 further comprising the steps of repeating steps (a) to (c) for each portion in the media surface.

35. The method of claim 32 further comprising the steps of repeating steps (a) to (c) for a plurality of media surfaces in the data storage device.

36. The method of claim 32 further comprising the steps of calculating a surface capacity of each media surface from the recordable linear density, track density, or error code level for the media surface.

37. The method of claim 36 further comprising the steps of summing the calculated surface capacities of each media surface to derive a device capacity, and qualifying the data storage device if the device capacity is higher than a target capacity.

38. The method of claim 32 wherein step (a) comprises the step of selecting a track density of data, linear density of data, or error code level of data, for a media surface comprising a disk surface of a disk drive.

39. A data storage device comprising:
a media surface having a data density determined by: (a) selecting for a portion of the media surface, one or more of a linear density of data, a track density of data, or an error code level of data, (b) recording data on the portion of the media surface at the selected linear density, track density, or error code level, (c) reading the recorded data and developing an error metric indicative of an error rate of the recorded data, and (d) comparing the error metric indicated error rate to a reference metric indicative of an acceptable error rate, and if the indicated error rate is greater than the acceptable error rate, repeating steps (b) to (d) for another linear density, track density, or error code level, until the indicated error rate is less than or equal to the acceptable error rate, to determine a recordable linear density, track density, or error code level of data for the portion of the media surface.

40. A method of testing a data storage device having a plurality of media surfaces, the method comprising the steps of:
(a) measuring for each media surface, at least one of a maximum recordable track density of data, maximum recordable linear density of data, or minimum recordable error code level of data;
(b) calculating the surface capacity of each media surface from the measured maximum recordable track density, maximum recordable linear density, or minimum recordable error code level; and
(c) summing the surface capacities of each media surface to determine a device capacity and qualifying the data storage device if the device capacity equals or exceeds a target capacity.

41. The method of claim 40 wherein step (a) comprises the steps of:
(1) selecting a track density of data and recording data in the selected track density on the media surface;
(2) reading the recorded data and measuring an error rate of the recorded data; and
(3) comparing the measured error rate to an acceptable error rate, and if the measured error rate is greater than the acceptable error rate, repeating steps (1) to (3) for the selected track density less a decrement, until the error rate is less than or equal to the acceptable error rate, to determine a maximum recordable data track density for the media surface.

42. The method of claim 41 wherein the media surface has a series of radially extending servo wedges written at a fixed servo track density and having servo bursts and further being interleaved between sectors of data tracks, and wherein at least some of the data tracks written at maximum recordable data track density are written at servo burst non-null radial positions.

43. The method of claim 40 wherein step (a) comprises the steps of:
(1) selecting a linear density of data and recording data in the linear density on the media surface;
(2) reading the recorded data and measuring an error rate of the recorded data; and
(3) comparing the measured error rate to an acceptable error rate, and if the measured error rate is greater than the acceptable error rate, repeating steps (1) to (3) for the linear density less a decrement, until the measured error rate is less than or equal to the acceptable error rate, to determine a maximum recordable linear density of data for the media surface.

44. The method of claim 40 wherein step (a) comprises the steps of:
(1) selecting an error code level of data and recording data in the error code level on the media surface;
(2) reading the recorded data and measuring an error rate of the recorded data; and (3) comparing the measured error rate to an acceptable error rate, and if the measured error rate is greater than the acceptable error rate, repeating steps (1) to (3) for the error code level plus an increment in error code level, until the measured error rate is less than or equal to the acceptable error rate, to determine a minimum recordable error code level of data for the media surface.

45. The method of claim 40 wherein step (a) comprises the step of measuring for each media surface, a maximum recordable linear density and track density of data, and further comprising the step of assigning to each media surface an error code level in relation to the measured maximum recordable linear density and track density.

46. A data storage device comprising a plurality of media surfaces prepared for storage of data by: measuring for each media surface, at least one of a maximum recordable track density of data, maximum recordable linear density of data, or minimum recordable error code level of data; calculating the surface capacity of each media surface from the measured maximum recordable track density, maximum recordable linear density, or minimum recordable error code level; and summing the surface capacities of each media surface to determine a device capacity and qualifying the data storage device if the device capacity equals or exceeds a target capacity.

47. A data storage device comprising a head, a media surface, and a controller capable of providing signals to the head for reading and writing data on a portion of the media surface, at a predetermined track density, linear density, or error code level of data, one or more of which are determined by measuring and then comparing against metrics indicative of acceptable track density, linear density, or error code level of data.

48. The data storage device of claim 47 wherein the controller is programmed to write data on each portion of the media surface at a plurality of track density, linear density, or error code levels of data.

49. The data storage device of claim 47 further comprising a plurality of magnetic heads and media surfaces, and wherein the controller is programmed to write data on each portion of a media surface at a plurality of track density, linear density, or error code levels of data.

50. The data storage device of claim 47 wherein the controller is programmed to write data on each portion of the media surface at a selected maximum recordable track density, a selected maximum recordable linear density of data, or a selected minimum recordable error code level of data, each of which is measured for a paired head and media surface by recording data on the respective media surface, reading the recorded data, and comparing track density, linear density or error code level of data to a metric.

51. The data storage device of claim 47 wherein the head comprises a magnetic head and the media surface comprises a magnetic surface, and wherein a magnetic head abuts a magnetic surface.

52. The data storage device of claim 47 wherein the head comprises a magnetic head and the media comprises a magnetic disk surface, and wherein the magnetic head is proximal to the magnetic surface upon an air bearing.

53. The data storage device of claim 52 wherein the magnetic disk surface defines a series of radially extending servo wedges recorded at a fixed servo track density and having servo bursts and further being interleaved between sectors of data tracks, and a head position digital controller, and wherein at least some of the data tracks are written under supervision of the controller at servo burst non-null radial positions of the magnetic disk surface.

54. A data storage device comprising a plurality of pairs of media surfaces and heads, and a controller that controls the heads for reading and writing data on the media surfaces, the controller being programmed to write data at a measured track density, linear density, or error code level of data, one or more of which are measured by the steps of:
    (a) selecting for a portion of a media surface, a linear density, track density, or error code level of data;
    (b) recording data on the portion of the media surface at the selected linear density, track density, or error code level;
    (c) reading the recorded data and developing a quality metric indicative of an error rate of the recorded data; and
    (d) comparing the quality metric to a reference metric indicative of an acceptable error rate, and if the indicated error rate is greater than the acceptable error rate, repeating steps (b) to (d) for another linear density, track density, or error code level, until the quality metric indicates an error rate less than or equal to the indicated acceptable error rate, to determine a measured linear density, track density, or error code level of data for the portion of the media surface.

55. The data storage device of claim 54 wherein the controller is programmed to write data on each portion of the media surface at a plurality of recordable track density, linear density, or error code levels of data.

56. The data storage device of claim 54 further comprising a plurality of heads and media surfaces, and wherein the controller is programmed to write data on each portion of the media surfaces at a plurality of recordable track density, linear density, or error code levels of data.

57. The data storage device of claim 54 wherein the controller is programmed to write data on each portion of the media surface at a maximum recordable track density, maximum recordable linear density of data, or a minimum recordable error code level of data, each of which is measured for a paired head and media surface.

58. The data storage device of claim 54 wherein the head comprises a magnetic head and the media surface comprises a magnetic surface, and wherein a magnetic head abuts a magnetic surface.

* * * * *